July 2, 1940.   W. F. BOLDT   2,206,656
VARIABLE RATIO CONTROL VALVE
Filed Sept. 17, 1938   2 Sheets-Sheet 1
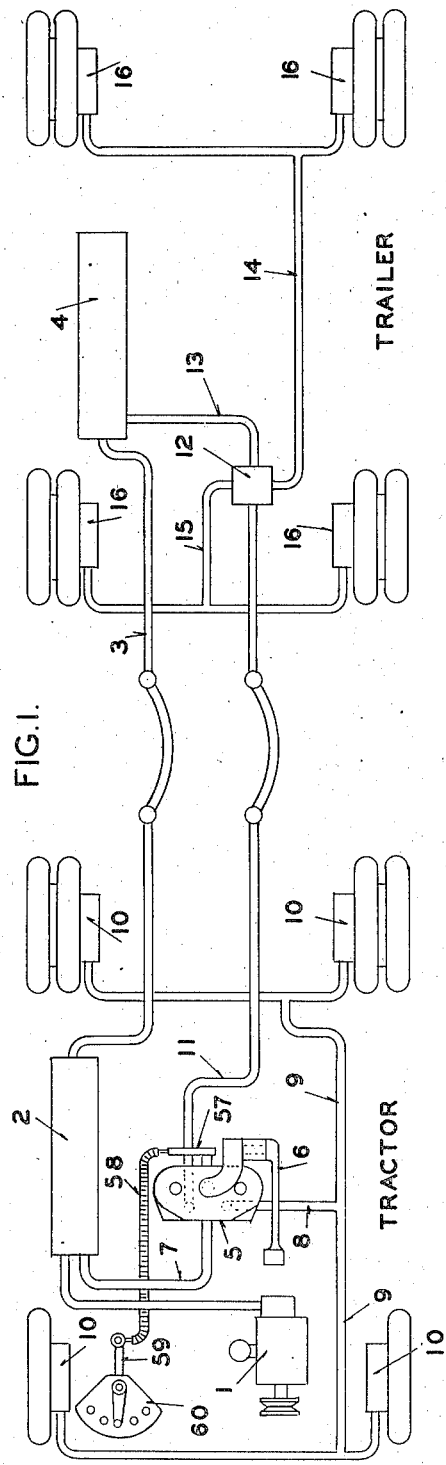
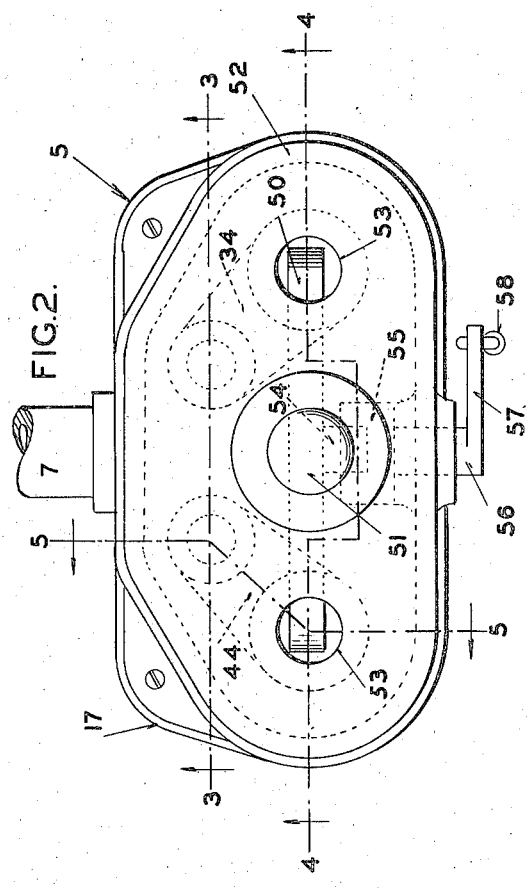
INVENTOR:
W. F. BOLDT
BY
ATTORNEY

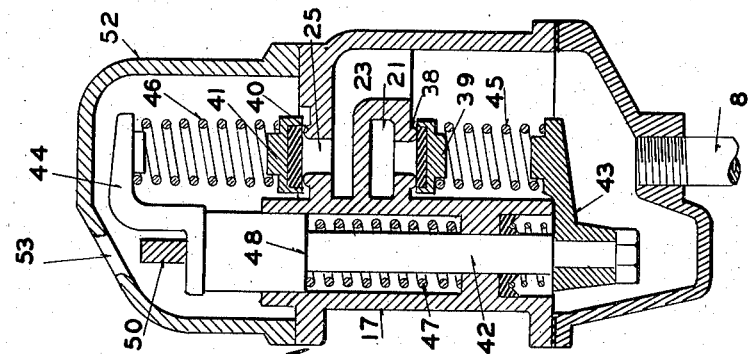
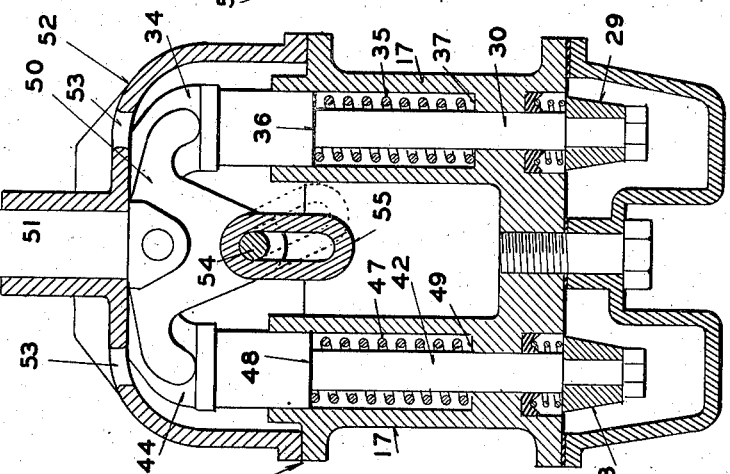
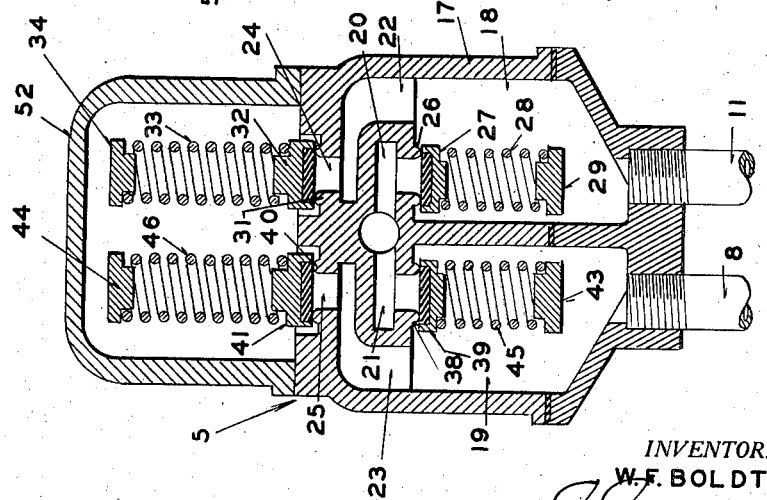

Patented July 2, 1940

REISSUED
SEP 29 1942

2,206,656

UNITED STATES PATENT OFFICE 2,206,656

VARIABLE RATIO CONTROL VALVE

Werner F. Boldt, Clayton, Mo., assignor to Wagner Electric Corporation, St. Louis, Mo., a corporation of Delaware Application September 17, 1938, Serial No. 230,413

11 Claims. (Cl. 188—3)

My invention relates to valve mechanism and more particularly to a valve mechanism for varying the ratio of fluid pressure which is applied to different fluid-actuated apparatus of a fluid pressure system.

One of the objects of my invention is to provide an improved valve mechanism for association with a fluid pressure system which will permit the operator to vary at will the ratio of fluid pressure which is supplied to different fluid pressure-actuated motors employed in the system.

Another object of my invention is to provide a fluid pressure-actuated braking system with an improved variable ratio control valve whereby the fluid pressures applied to actuate the sets of brakes may be so controlled that the pressure applied to one set of brakes can be varied with respect to the pressure applied to another set of brakes.

Still another object of my invention is to provide an improved variable ratio control valve for a fluid pressure-actuated system that is simple in construction, efficient in operation and which is capable of varying the ratios of the pressures applied to the different fluid pressure-actuated apparatus over a wide range.

Other objects of my invention will become apparent from the following description taken in connection with the acompanying drawings in which Figure 1 is a schematic view of a fluid pressure-actuated brake system having associated therewith a control valve mechanism embodying my invention; Figure 2 is an end view of the control valve mechanism; Figures 3, 4 and 5 are longitudinal cross-sectional views of the control valve mechanism taken on the lines 3—3, 4—4 and 5—5, respectively, of Figure 2.

Referring to Figure 1, there is schematically disclosed a tractor and a trailer having associated therewith an air brake system in which is embodied my novel control valve whereby the ratio of braking pressure applied to the tractor brakes and to the trailer brakes may be varied at the will of the operator. Although the brake system shown is on a tractor-trailer vehicle, my novel control valve may be employed with only the tractor brake system if such is desired, it being understood that the disclosure is by way of example only. Numeral 1 indicates a compressor which supplies fluid under pressure to the main reservoir 2 on the tractor, this reservoir being connected by an emergency line 3 to the trailer reservoir 4 for supplying air under pressure thereto. My novel control valve 5 is positioned upon the tractor and adapted to be actuated by the brake pedal 6. The control valve is connected to the main reservoir 2 by a conduit 7 and by means of a conduit 8 with the tractor conduits 9 for actuating the brake power cylinders 10 on the tractor. A conduit 11 is also connected to the valve and extends rearwardly to the trailer where it is connected to a known type of relay valve 12, which is of such construction that when pressure is admitted to conduit 11, conduit 13 from the trailer reservoir is connected to the conduits 14 and 15 leading to the trailer brake power cylinders 16. A given pressure in conduit 11 causes the relay valve to admit an equal amount of pressure from the trailer tank to the trailer brake cylinders.

Referring to Figures 2, 3, 4 and 5, my novel control valve mechanism 5 comprises a main casing 17 provided with chambers 18 and 19, the former being connected with conduit 11 leading to the relay valve on the trailer and the latter being connected with conduit 8 leading to conduits 9 of the tractor brake power cylinders. The valve casing is also formed with passages 20 and 21 which, respectively, connect chambers 18 and 19 with conduit 8 leading from the main reservoir. Suitable passages 22 and 23 are also provided in the casing for connecting chambers 18 and 19 to exhaust ports 24 and 25.

The passage 20 has associated therewith a valve seat 26 and cooperating therewith is a valve element 27 biased to a seated position by a spring 28. This spring is interposed between the valve element and an arm 29 carried by one end of a rod 30 reciprocably mounted in the valve casing 17. The exhaust port 24 of passage 22 has associated therewith a valve seat 31 and cooperating with this seat is a valve element 32 biased to a seated position by a spring 33. This spring is interposed between valve element 32 and an arm 34 carried by the other end of the reciprocable rod 30.

The springs 28 and 33 acting upon the valve elements 27 and 32 are of like construction and characteristics, and the arms 29 and 34 on the reciprocable member are so spaced apart that when the reciprocable member is in its normally inoperative position, as shown in Figure 4, spring 33 exerts substantially no pressure on the valve element 32 and spring 28 exerts a maximum pressure tending to seat valve element 27. In order to insure that the reciprocable member is maintained in its inoperative position, a spring 35 is interposed between a shoulder 36 on the reciprocable member and an abutment 37 on the casing. This spring being of greater strength than spring 28 holding the valve element 27 seated.

The passage 21 leading to chamber 19 has associated therewith valve seat 38 and cooperating therewith is a valve element 39. The exhaust port 25 associated with passage 23 has associated therewith a valve seat 40 with which cooperates valve element 41. The mechanism for controlling the valve elements 39 and 41 is identical with the mechanism already described for controlling the valve elements 27 and 32. A rod 42 is reciprocably mounted in casing 17 in parallel relation to the reciprocable rod 30 and the ends of this rod are provided with arms 43 and 44. A spring 45 is interposed between the valve element 39 and the arm 43 and a spring 46 is interposed between arm 44 and valve element 41, these springs having the same characteristics as the springs 28 and 33 already referred to. The reciprocable rod is biased to its inoperative positon by a spring 47 interposed between a shoulder 48 on rod 42 and an abutment 49 on the casing.

The two reciprocable rods 30 and 42 are adapted to be operated simultaneously by means of a link 50 pivotally mounted at its center to a plunger 51 reciprocably mounted in a housing 52 secured to the main casing 17. This housing encloses the link 50, the ends of the reciprocable rod and springs 33 and 46 and has openings 53 for permitting the exhausted air to pass into the atmosphere. The ends of link 50 are in abutting relation only with the ends of the reciprocable rod, thus permitting free relative movement between these elements. The central portion of the link carries a pin 54 which is adapted to cooperate with a grooved member 55 carried by a shaft 56 journaled in the housing 52. The shaft 56, having its axis at one end of the grooved member, is in axial alignment with pin 54 when the link 50 is in its inoperative position as shown in Figure 4. The shaft 56 carries an arm 57 whereby the shaft and the grooved member 55 may be rotated from a remote point by a Bowden wire 58 connected to a lever 59, which lever is preferably mounted in the operator's compartment of the vehicle. An indicating plate 60 is associated with lever 59 to indicate the position of the grooved member 55 and to also hold the lever in any position in which it may be placed.

When the reciprocable rods 30 and 42 are in their inoperative positions, shown in Figure 4, the valve elements 27 and 39 will be seated under a predetermined pressure determined by the strength of springs 28 and 45. These springs are chosen to be of such strength that they will maintain the valves seated when the maximum pressure is in the tractor reservoir. Under these conditions the valve elements 32 and 41 are maintained seated by substantially no pressure by their springs 33 and 46, and the chambers 18 and 19 are freely exhausted to atmosphere. If rod 30 is moved against its biasing spring 35, spring 33 will be compressed and apply pressure to valve element 32. This also results in spring 28 being expanded, thus exerting less pressure tending to hold the valve element 27 seated. As the spring pressure acting on valve element 27 is decreased, fluid under pressure from the main reservoir will be permitted to enter chamber 18, this pressure being proportioned to the decrease in the pressure of spring 28. Since springs 28 and 33 are of identical construction, the amount of decrease in the spring pressure acting on one valve element is always equal to the amount of increase in spring pressure acting on the other valve as the rod is moved. The valve element 32 will at all times be held seated with a sufficient pressure to prevent exhausting of any air from the chamber 18. Return of the reciprocable rod toward its normal inoperative position causes a decrease in pressure of spring 33, thus permitting chamber 18 to exhaust fluid.

When the reciprocable rod 42 is actuated, fluid under pressure will be admitted to chamber 19 in the same manner as fluid is admitted to chamber 18. The return movement of the reciprocable rod permits the exhausting of the fluid under pressure from chamber 19.

Since the change in spring pressure determines the amount of air admitted or exhausted into the chamber and the change in spring pressure is dependent upon the movement of the reciprocable rod, it follows that the movement of the reciprocable rod will be in proportion to the amount of pressure admitted to the chamber. Thus it is seen that if rod 30 is moved a given distance and rod 42 is moved a lesser distance, a greater amount of pressure will be admitted to chamber 18 than to chamber 19.

When the grooved guide member 55 is in a position where the groove is parallel with the axes of the reciprocable rods, any movement of plunger 51 by the brake pedal will result in a simultaneous and uniform movement of the reciprocable rods. Under these conditions the same amount of air pressure will be admitted and exhausted from chambers 18 and 19 in the valve casing. Since chamber 18 is connected to the trailer relay valve and chamber 19 is connected to the tractor brakes, both the tractor and trailer brakes will be applied with equal air pressure.

If it is desired to apply the trailer brakes with a greater pressure than the tractor brakes, the grooved member 55 is moved by the control mechanism to a position where the groove will be at an angle to the axes of the reciprocable rods and the movable end thereof positioned closer to the reciprocable rod 42. When the plunger 51 is operated by the brake pedal, pin 54 in the link 50 will be guided in the groove of member 55, thus causing the link 50 to move the reciprocable rod 30 a greater distance than the reciprocable rod 42. This will cause a greater air pressure to be admitted to chamber 18 than to chamber 19 for a given movement of the brake pedal. Consequently more pressure will be applied to the trailer brakes than is applied to the tractor brakes. The ratio between the pressures being applied to the trailer and tractor brakes will always be the same for any given setting of the guide member 55. Thus with the guide so set as to give a 4 to 5 ratio then if the plunger 51 is moved so that 8 pounds per square inch of pressure is admitted to the tractor brake power cylinders 10 pounds per square inch will be admitted to the trailer brake power cylinders. If further movement of the plunger causes 20 pounds per square inch of pressure to be admitted to the tractor brake power cylinders then 25 pounds per square inch will be admitted to the trailer brake power cylinders. The ratio of pressures will thus always be the same for the given setting of the guide.

When it is desired to have the tractor brakes applied with a greater force than the trailer brakes, the guide member 55 is positioned at an angle to the axes of the reciprocable rods but on the opposite side of the center line. When the brake pedal is now operated to actuate the rod, rod 42 will be moved a greater distance than the rod 30, thus causing more pressure to be admitted to chamber 19 than to chamber 18 for a given movement of plunger 51. In the construction shown, the guide member 55 may be set so that either the tractor or the trailer may receive as low as thirty-five per cent of the braking force and the other vehicle receives as high as sixty-five per cent.

From the foregoing description of my variable ratio control valve and the manner in which it is embodied in the braking system, it is apparent that the tractor and trailer brakes may be controlled in any manner desired simply by movement of a control member in the operator's compartment of the vehicle. The operator may secure the desired braking action for all varying load conditions of the tractor and trailer. Thus when the tractor is empty and the trailer is fully loaded, he can so set the control valve that a greater braking action is present on the trailer than on the tractor.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, two fluid pressure-actuated motors, means for placing the motors in communication with the source of pressure and comprising two conduits, a valve means for controlling each conduit, a single means for operating the valve means, and means for causing one of the valve means to admit a greater fluid pressure to one of the motors than that admitted to the other motor by the other valve means when the single means is operated, said means embodying means for causing the fluid pressures to have a constant ratio throughout the range of operation of the single means.

2. In a fluid pressure system, a source of fluid pressure, two fluid pressure-actuated motors, means for placing the motors in communication with the source of pressure and comprising two conduits, a valve means for controlling each conduit, a single means for operating the valve means, means for causing one of the valve means to admit a greater fluid pressure to one of the motors than that admitted to the other motor by the other valve means when the single means is operated, said means embodying means maintaining a constant ratio between the pressures throughout the range of operation of the valve operating means, and manually-controlled means for varying the ratio of the fluid pressure admitted to the motors.

3. In a fluid pressure system, a source of fluid pressure, two fluid pressure-actuated motors, means for placing the motors in communication with the source of pressure and comprising two conduits, valve means associated with the conduits for admitting fluid pressures to the motors at a constant ratio throughout the operating range, means for operating the valve means, and manually-controlled means for changing the constant ratio of the fluid pressures admitted to the motors.

4. In a fluid pressure braking system for a tractor-trailer vehicle, fluid pressure-operated brakes on the tractor and trailer, a source of fluid pressure, conduit means for connecting the fluid pressure-operated brakes to the source of pressure, valve means associated with the conduit means for controlling the application of fluid under pressure to the fluid pressure-operated brakes, and manually-controlled means associated with the valve means and operable at will for establishing a plurality of constant ratios of fluid pressures which can be applied to the tractor fluid pressure-operated brakes and to the trailer fluid pressure-operated brakes by said valve means.

5. In a fluid pressure braking system for a tractor-trailer vehicle, fluid pressure-operated brakes on the tractor and trailer, a source of fluid pressure, conduit means for connecting the fluid pressure-operated brakes to the source of pressure, valve means associated with the conduit means for controlling the application of fluid under pressure to the fluid pressure-operated brakes, the fluid pressure which is applied to the tractor brakes having a constant ratio to that applied to the trailer brakes throughout the operating range, and manually-controlled means associated with said valve means for varying the ratio at will.

6. In a fluid pressure system, a source of fluid pressure, two fluid pressure-actuated motors, means for placing the motors in communication with the source of pressure and comprising two conduits, a valve means for controlling each conduit and provided with an actuating stem, an actuating member, connecting means for operating the valve stems by the actuating member, and means controlling said connecting means so that one of the valve stems will be actuated in advance of the other and the ratio of the distances of movement of the stems will be constant.

7. In a fluid pressure system, a source of fluid pressure, two fluid pressure-actuated motors, means for placing the motors in communication with the source of pressure and comprising two conduits, a valve means for controlling each conduit, a single member for operating both of said valve means, means for causing one of the valves to admit a greater fluid pressure to one of said motors than the other valve means does to the other fluid motor, said fluid pressures having a constant ratio throughout the fluid pressure ranges, and manually-controlled means for varying said ratio at will.

8. In a fluid pressure system, a source of fluid pressure, two fluid pressure-actuated motors, means for placing the motors in communication with the source of pressure and comprising two conduits, valve means for controlling each conduit and provided with an actuating stem, the amount of pressure admitted to each fluid motor being proportional to the travel of the actuating stem of the valve means, a single member for operating the valve stems, and means operable at the will of the operator for causing either of the valve stems to be moved a greater distance than the other or both the same distance when the single member is operated, the ratio of the distances of movement of the stems being constant.

9. In a fluid pressure system, a source of fluid pressure, two fluid pressure-actuated motors, means for placing the motors in communication with the source of pressure and comprising two conduits, valve means for controlling each conduit and provided with an actuating stem, an actuating member, a member cooperating at its ends with said stems and pivoted at its center to the actuating member, and means for causing said member to move one of the stems in advance of the other stem when the actuating member is operated, the distances of movement of the stems having a constant ratio throughout their range of movement.

10. In a fluid pressure system, a source of fluid pressure, two fluid pressure-actuated motors, means for placing the motors in communication with the source of pressure and comprising two conduits, valve means for controlling each conduit and provided with an actuating stem, an actuating member, a member cooperating at its ends with said stems and pivoted at its center to the actuating member, means for causing said member to move either of the stems in advance of the other stem when the actuating member is operated, said means embodying means causing the distances of movement of the stems to have a constant ratio and means for controlling said last named means from a remote point to thereby vary the ratio.

11. In a fluid pressure system, a source of fluid pressure, two fluid pressure-actuated motors, means for placing the motors in communication with the source of pressure and comprising two conduits, valve means for controlling each conduit and provided with a longitudinally movable stem, said stems being positioned in parallel relation, an actuating member, a member cooperating at its ends with said stems and pivoted at its center to the actuating member, guide means for causing one end of the last named member to move a greater distance than the other end when the actuating member is moved, said distances of movement having a constant ratio, and means for adjusting said guide means to vary the ratio.

WERNER F. BOLDT.